United States Patent
Yoneya et al.

[11] Patent Number: 5,437,847
[45] Date of Patent: Aug. 1, 1995

[54] METHOD OF SEPARATING AND RECOVERING RUTHENIUM FROM HIGH-LEVEL RADIOACTIVE LIQUID WASTE

[75] Inventors: Masayuki Yoneya, Suginami; Kazuhiro Kawamura; Shin-ichiro Torata, both of Ibaraki; Takeshi Takahashi, Katsuta, all of Japan

[73] Assignee: Doryokuro Kakunenryo Kaihatsu Jigyodan, Tokyo, Japan

[21] Appl. No.: 350,643

[22] Filed: Dec. 7, 1994

Related U.S. Application Data

[63] Continuation of Ser. No. 165,498, Dec. 13, 1993, abandoned.

Foreign Application Priority Data

Dec. 15, 1992 [JP] Japan ................................. 4-334277

[51] Int. Cl.6 ...................... C01F 13/00; C01F 15/00
[52] U.S. Cl. .............................. 423/2; 423/10; 423/22; 205/257; 205/98; 205/99
[58] Field of Search ............. 423/2, 10, 22; 205/257, 205/98, 99; 252/627, 631

References Cited

U.S. PATENT DOCUMENTS

| | | | |
|---|---|---|---|
| 3,891,741 | 6/1975 | Carlin et al. | 423/2 |
| 3,922,231 | 11/1975 | Carlin et al. | 252/301.1 W |
| 3,932,225 | 1/1976 | Bilal et al. | 204/1.5 |
| 4,002,470 | 1/1977 | Isa et al. | 75/101 R |
| 4,056,482 | 11/1977 | Schmieder et al. | 252/301.1 W |
| 4,282,112 | 8/1981 | Fitoussi et al. | 252/301.1 |
| 4,390,366 | 6/1983 | Lea et al. | 75/101 BE |
| 4,816,209 | 3/1989 | Schweiger | 376/309 |
| 4,840,765 | 6/1989 | Doherty | 376/310 |
| 4,879,006 | 11/1989 | Turner | 204/1.5 |
| 4,938,895 | 7/1990 | Motojima | 252/627 |
| 5,190,623 | 3/1993 | Sasaki et al. | 204/1.5 |
| 5,250,166 | 10/1993 | Motojima et al. | 204/222 |

Primary Examiner—Donald P. Walsh
Assistant Examiner—Meena Chelliah
Attorney, Agent, or Firm—Wenderoth, Lind & Ponack

[57] ABSTRACT

A method of recovering volatile ruthenium, which is separated and formed by constant potential electrolysis from high-level radioactive liquid waste discharged from the reprocessing step of spent nuclear fuel by purex process, in the form of stable solid. The method comprises electrolyzing at a constant potential a high-level radioactive liquid waste from which palladium has substantially been removed in advance, thereby vaporizing ruthenium, bringing the vaporized ruthenium into contact with an aqueous solution of formic acid to precipitate ruthenium oxide, and separating the precipitate from the aqueous solution of formic acid.

6 Claims, 2 Drawing Sheets

METHOD OF SEPARATING AND RECOVERING RUTHENIUM FROM HIGH-LEVEL RADIOACTIVE LIQUID WASTE

This application is a continuation of now abandoned application, Ser. No. 08/165,498, filed Dec. 13, 1993.

BACKGROUND OF THE INVENTION

The present invention relates to a method of efficiently separating and recovering volatile ruthenium contained in high-level radioactive liquid waste discharged from the reprocessing step of spent nuclear fuel by purex process.

In the reprocessing step of spent nuclear fuel by purex process, there is utilized a method wherein uranium and plutonium are extracted with a solvent from a solution of spent fuel in nitric acid and leaving radioactive fission products in the solution of nitric acid. The solution of fission products in nitric acid is referred to as high-level radioactive liquid waste (hereinafter abbreviated to "high-level liquid waste"), which is eventually solidified, stored and disposed of as a vitrified body. When the high-level liquid waste is melt mixed with a vitrifying agent in a melting furnace in the vitrifying treatment, ruthenium as one of the fission products interferes with the stable operation of the glass melting furnace.

Under such circumstances investigations have heretofore been made on the separation and removal of ruthenium from the high-level liquid waste. As one of the measures, there is proposed a method wherein the high-level liquid waste is electrolyzed at a constant potential to electrolytically oxidize ruthenium.

However, the ruthenium which is formed by the above-mentioned electrolytic oxidation is volatile and is separated in gaseous form from the high-level liquid waste. The gaseous ruthenium is chemically unstable, is liable to adhere to the walls of surrounding equipments, and accelerates the corrosion of the process equipments by its oxidizing power. Since ruthenium as one of the fission products is a radioactive substance, it pollutes the equipments when adhered thereto. In addition, volatile ruthenium is unlikely to be absorbed in water and worsens the efficiency of its removal in a scrubber, thus increasing the amount of the radioactive ruthenium discharged to the environment. Even when the volatile ruthenium is absorbed in an absorbent, the amount of the ruthenium thus absorbed is limited because of the poor absorbing performance of the absorbent, thus increasing the amount of radioactive solid waste.

SUMMARY OF THE INVENTION

It is therefore an object of the present invention to provide a method capable of recovering the volatile ruthenium, which is formed and separated from high-level liquid waste by constant potential electrolysis, in the form of stable solid and thereby eliminating the problems attributable to the volatile ruthenium including the adhesion of the volatile ruthenium to the process equipments, the discharge of radioactive substances to tile environment, and an increase in the amount of radioactive solid waste.

Specifically the method of recovering ruthenium from high-level liquid waste according to the present invention comprises electrolyzing at a constant potential a high-level liquid waste from which palladium has substantially been removed in advance thereby vaporizing ruthenium from the liquid waste, bringing the vaporized ruthenium into contact with an aqueous solution of formic acid to precipitate ruthenium oxide, and separating the precipitate from the aqueous solution of formic acid to recover ruthenium.

The reason for removing palladium in advance from the high-level liquid waste will be described. The high-level liquid waste contains palladium which, as well as ruthenium, belongs to the platinum group elements. The coexistence of palladium with ruthenium in high-level liquid waste makes it difficult to electrolytically recover the ruthenium in electrolyzing tile high-level liquid waste for recovering ruthenium. Therefore, it is necessary in the present invention to substantially remove palladium in advance from the high-level liquid waste prior to the electrolytical recovery of ruthenium so as to decrease the concentration of palladium to such an extent that the electrolytical recovery is not hindered. The methods usable for removing palladium from high-level liquid waste include a chemical method wherein a precipitating agent or a complexing agent is added into the high-level liquid waste to remove palladium as a precipitate or a complex, and an electrolytical method wherein the high-level liquid waste is electrolyzed at a constant potential to separate palladium as a deposit. The electrolytical method is favorable, because the electrolysis apparatus to be used for carrying out the process of the present invention is usable also for the above-mentioned electrolytical removal of palladium.

PREFERRED EMBODIMENTS OF THE INVENTION

Figure 1:
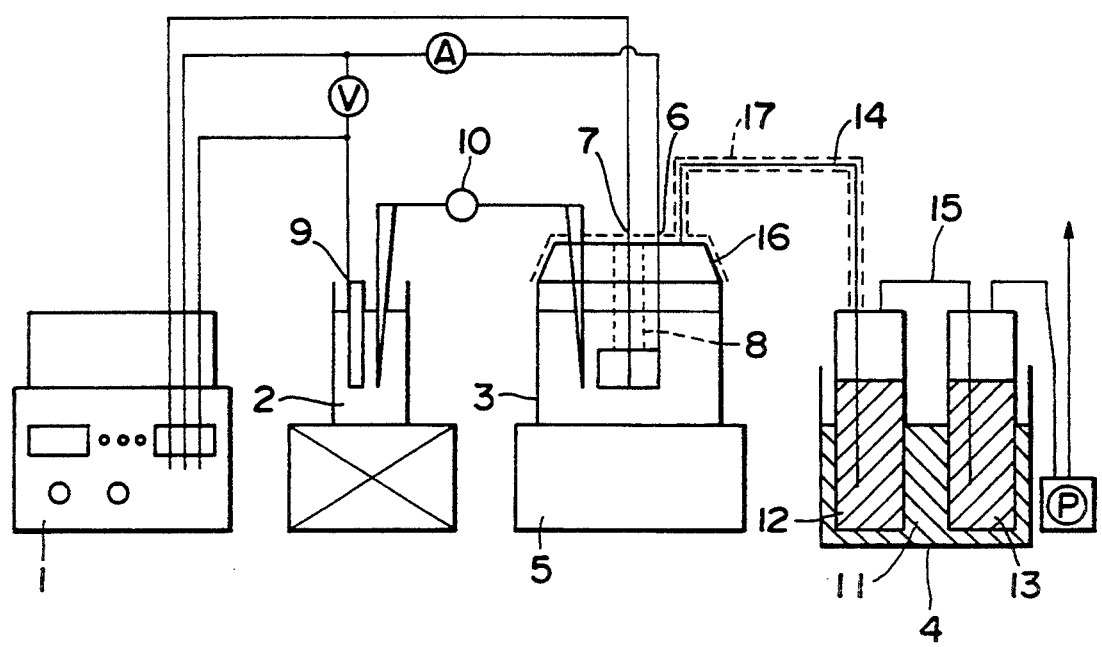
FIG. 1 is an explanatory drawing showing an example of an electrolysis apparatus which is preferably used for carrying out the present invention.

FIG. 1 illustrates a constitutional example of the electrolysis apparatus which is favorably employed to carry out the process of the present invention. The apparatus is composed of a constant potential generating unit 1 which supplies electric power necessary for the electrolysis, a reference cell 2 which provides zero potential necessary for measuring a constant potential, an electrolytic cell 3 which electrolyzes the high-level liquid waste to vaporize ruthenium and a recovery vessel 4 which recovers the vaporized ruthenium.

Figure 2:
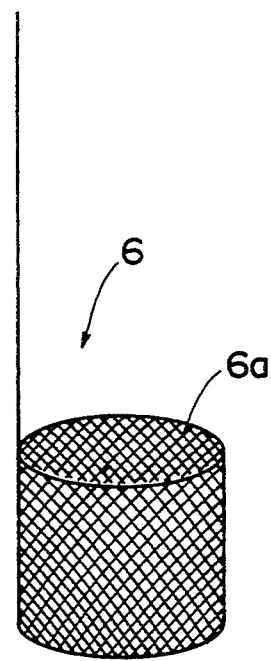
FIG. 2 is an explanatory drawing showing an example of a working electrode to be used in the electrolysis apparatus in FIG. 1.

The electrolytic cell 3 is placed on a hot stirrer 5, contains tile high-level liquid waste to be treated therein and is equipped with a working electrode (anode) 6 and a counter electrode (cathode) 7. Examples of the working electrode 6 preferably used for electrolyzing ruthenium include a flat mesh plate made of platinum and molded into a cylinder 6a as shown in FIG. 2. As the counter electrode 7, platinum wire may be used and it is placed in the center of the cylinder 6a of the working electrode 6. In order to prevent the decomposition gas generated from the counter electrode 7 at the time of electrolysis from moving to the working electrode 6 and hindering the electrolytic reaction on the surface of the working electrode, it is desirable to install a partition 8 between the working electrode 6 and the counter electrode 7. The electrodes 6, 7 and the partition 8 are placed in the middle portion of the electrolytic cell 3 so that the area of the portion of the electrodes which is immersed in the electrolyte (the high-level liquid waste) is kept constant.

The reference cell 2 is filled with the same electrolyte as that for the electrolytic cell 3 and is equipped inside with a reference electrode 9 such as a silver-silver chloride electrode. The reference cell 2 is connected to the electrolytic cell 3 through a salt bridge 10. Since the electrode potential in the electrolytic cell 3 varies with the progress of the electrolytic reaction, the potential of the reference electrode 9 which is inserted into the reference cell 2 filled with the electrolyte not contributing to the electrolytic reaction is set to tile standard zero potential. Thus, the potential between the reference electrode 9 and the working electrode 6 is made constant, thereby enabling the constant potential electrolysis to be carried out.

The recovery vessel 4 is equipped with a thermostatic vessel 11 kept at a constant temperature and absorption columns 12, 13 which contain an aqueous solution of formic acid and are placed in the vessel 11. The volatile ruthenium generated in the vessel 11. The volatile ruthenium generated in the electrolytic cell 3 is sucked with a pump P via glass pipes 14, 15 and led to tile absorption columns 12, 13. In the example shown in FIG. 1, there are installed two absorption columns in which the volatile ruthenium which has not been absorbed in the first absorption column 12 is successively led to the second absorption column 13. The outside surface of a top cover 16 of the electrolytic cell 3 and the glass pipe 14 which connects the electrolytic cell to the recovery vessel are wrapped with a ribbon heater 17 for heating to about 105° C. to prevent the volatile ruthenium from condensing onto the rear side of the top cover 16 of the electrolytic cell and the inside of the glass pipe 14. The thermostatic vessel 11 in the recovery vessel 4 is maintained at a temperature of, for example, about 4° C. which is suitable for absorbing the ruthenium in an aqueous solution of formic acid. The precipitate formed in each of the absorption columns 12, 13 placed in the recovery vessel 4 is a stable ruthenium oxide consisting essentially of $RuO_2$ and can easily be separated and recovered from the aqueous solution of formic acid by filtration or the like.

The electrolysis apparatus as shown in FIG. 1 can be employed also for the purpose of electrolytically removing palladium in advance from the high-level liquid waste. It is desirable in this case to use as the electrodes, a working electrode made of platinum wire formed into coil and a counter electrode made of platinum wire.

Now, the present invention will be described in more detail with reference to an example.

Example

The simulative high-level liquid waste used herein was a nitric acid solution containing tile elements same as those contained in a high-level liquid waste separated in the reprocessing step of spent fuel by the purex process. The simulative liquid waste contained 1700 ppm of ruthenium and 920 ppm of palladium.

Removal of Palladium

The simulative liquid waste was put in the electrolytic cell 3 of the electrolysis apparatus as shown in FIG. 1. The electrolytic cell 3 was equipped with a working electrode made of platinum wire (2 mm in diameter) formed into coil and a counter electrode made of platinum wire (1 mm in diameter). A constant potential (0.01 V/SSE) was applied to the working electrode with the constant potential generating unit (potentio/gelvanostat) 1, whereby constant potential electrolysis was carried out at an electrolysis temperature of 17° to 50° C. to remove palladium from the simulative liquid waste by depositing palladium onto the counter electrode. It was possible to remove palladium by about 90% after about 8 hours of electrolysis.

Separation and Recovery of Ruthenium

Figure 3:
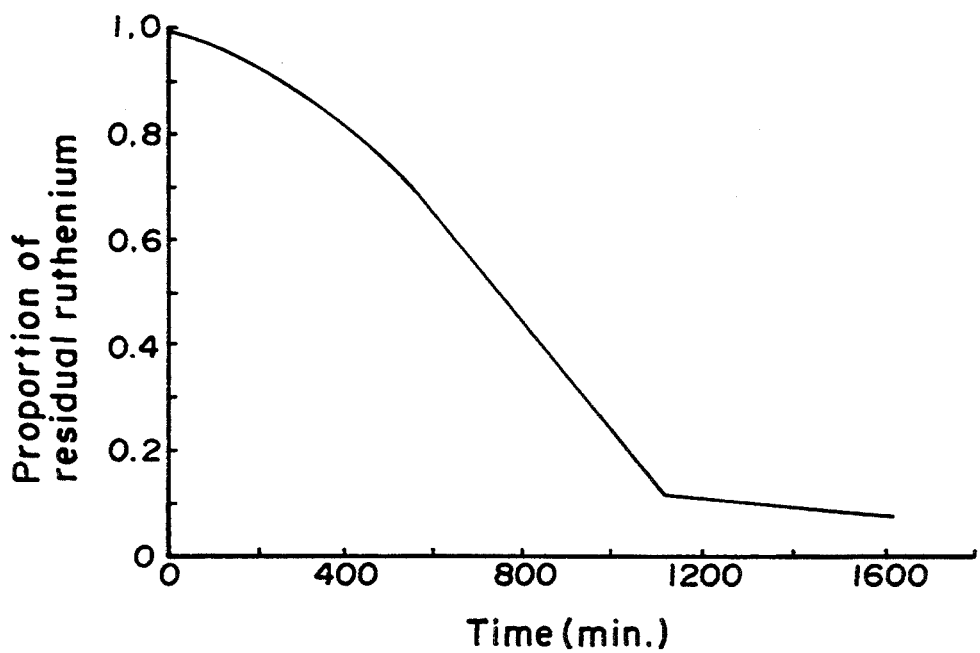
FIG. 3 is a graph showing changes in the proportion of residual ruthenium in an electrolyte in the example of the present invention with the elapse of time.

The simulative liquid waste from which the palladium had been removed in the manner described above was subsequently subjected to constant potential electrolysis by using the same electrolysis apparatus. The working electrode 6 of the electrolytic cell 3 was one made from a flat mesh plate (80 mesh) made of platinum and formed into a cylinder 6a (50 mm diameter and 60 mm height) as shown in FIG. 2, while the counter electrode 7 was one made from platinum wire (1 mm diameter). A constant potential (1.85 V/SSE) was applied to the working electrode 6 with the constant potential generating unit 1, whereby constant potential electrolysis was carried out at an electrolysis temperature of about 50° C. to vaporize volatile ruthenium in the electrolytic cell 3. The vaporized ruthenium was led to the recovery vessel 4 via the glass pipe 14 and was brought into contact with an aqueous solution of formic acid by gas-liquid contact to allow ruthenium to be absorbed in the solution and precipitated as ruthenium oxide in tile absorption columns 12, 13. FIG. 3 shows changes in the proportion of the residual ruthenium in the simulative liquid waste contained in the electrolytic cell 3 with tile elapse of time. As can be seen from the graph shown in FIG. 3, ruthenium could be separated and recovered by about 90% after about 27 hours of electrolysis.

Figure 4:
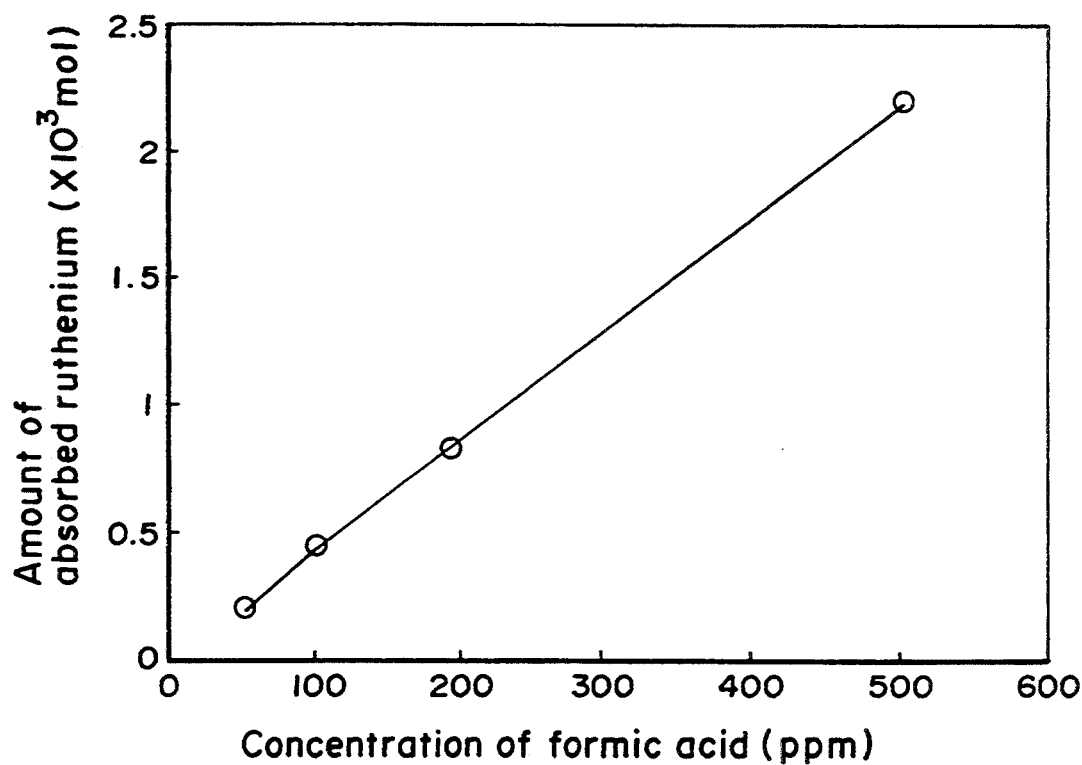
FIG. 4 is a graph showing the relationship between the concentration of formic acid in an aqueous solution contained in a recovery vessel in the example of the present invention and the amount of ruthenium absorbed in the solution.

The concentration of formic acid in the aqueous solution was varied in the range of 50 to 500 ppm to investigate the variation in the amount of the volatile ruthenium absorbed in the solution. The results are given in FIG. 4. As can be seen from tile graph shown in FIG. 4, the amount of the absorbed volatile ruthenium increases with an increase in the concentration of the formic acid in the range of concentration above-described.

As can be understood from the foregoing description, the method according to the present invention is capable of precipitating stable ruthenium oxide in an aqueous solution of formic acid by vaporizing volatile ruthenium through the constant potential electrolysis of high-level liquid waste and bringing the vaporized ruthenium into gas-liquid contact with the solution of formic acid. Thereby, the method can eliminate the problems arising from the volatile ruthenium, such as the adhesion of the volatile ruthenium to the process equipments, the discharge of radioactive substances to the environment and an increase in the amount of radioactive solid waste.

In addition, the precipitate can easily be separated and recovered by filtration or the like, and it is made possible to utilize the recovered ruthenium as a useful metal.

What is claimed is:

1. A method of separating and recovering ruthenium from high-level radioactive liquid waste comprising electrolyzing at a constant potential a high-level radioactive liquid waste from which palladium has substantially been removed in advance, thereby vaporizing ruthenium from the liquid waste, bringing the vaporized ruthenium into contact with an aqueous solution of formic acid to precipitate ruthenium oxide, and separating tile precipitate from the aqueous solution of formic acid to recover ruthenium.

2. The method according to claim 1, wherein the constant potential electrolysis is carried out in an electrolytic cell having a top cover and equipped with a working electrode and a counter electrode, the contact of the vaporized ruthenium with the aqueous solution of formic acid is carried out in a recovery vessel equipped with a thermostatic vessel kept at a constant temperature and an absorption column which contains the aqueous solution of formic acid and is placed in the thermostatic vessel, and the vaporized ruthenium in the electrolytic cell is led to the absorption column via a pipe.

3. The method according to claim 2, wherein the constant potential electrolysis is carried out by using a working electrode composed of a flat mesh plate made of platinum and molded into a cylinder and a counter electrode composed of platinum wire, the counter electrode being placed in the center of the cylinder of the working electrode.

4. The method according to claim 2, wherein the top cover of the electrolytic cell and the pipe connecting the electrolytic cell with the absorption column are heated to thereby prevent the vaporized ruthenium from condensing onto the rear side of the top cover and the inside of the pipe.

5. The method according to claim 1, wherein the constant potential electrolysis is carried out at a temperature of about 50° C. and the contact of the vaporized ruthenium with the aqueous solution of formic acid is carried at about 4° C.

6. The method according to claim 1, wherein the concentration of formic acid in the aqueous solution is in the range of 50 to 500 ppm.

* * * * *